US012368719B2

(12) United States Patent
Schwartz et al.

(10) Patent No.: US 12,368,719 B2
(45) Date of Patent: Jul. 22, 2025

(54) SYNCHRONIZING A USER'S AUTHENTICATION STATE ACROSS MULTIPLE DATA CENTERS USING EVENT MESSAGES

(71) Applicant: RED HAT, INC., Raleigh, NC (US)

(72) Inventors: Alexander Schwartz, Hofheim am Taunus (DE); Stefan Guilhen, Sao Paulo (BR); Martin Kanis, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 261 days.

(21) Appl. No.: 18/084,881

(22) Filed: Dec. 20, 2022

(65) Prior Publication Data

US 2024/0205227 A1 Jun. 20, 2024

(51) Int. Cl.
*H04L 9/40* (2022.01)

(52) U.S. Cl.
CPC .......... *H04L 63/102* (2013.01); *H04L 63/083* (2013.01); *H04L 63/108* (2013.01)

(58) Field of Classification Search
CPC .... H04L 63/102; H04L 63/083; H04L 63/108
See application file for complete search history.

(56) References Cited

U.S. PATENT DOCUMENTS

| 8,082,316 | B2 | 12/2011 | Rakowski et al. | |
|---|---|---|---|---|
| 9,230,003 | B2 | 1/2016 | Goetsch | |
| 9,703,981 | B1 * | 7/2017 | Marion | H04W 12/06 |
| 9,729,651 | B2 * | 8/2017 | Jeon | H04L 51/56 |
| 10,693,864 | B2 | 6/2020 | Mathew et al. | |
| 11,061,929 | B2 | 7/2021 | Xu et al. | |
| 11,165,634 | B2 * | 11/2021 | Medam | G06F 11/2094 |
| 11,290,438 | B2 | 3/2022 | Mathew et al. | |
| 2007/0118491 | A1 * | 5/2007 | Baum | G06F 16/35 |
| | | | | 706/20 |
| 2008/0066183 | A1 * | 3/2008 | George | G06F 21/80 |
| | | | | 726/27 |

(Continued)

OTHER PUBLICATIONS

Paiusescu et al., "Efficient Datacenters Management for Network and Security Operations," https://ieeexplore.ieee.org/abstract/document/8514148, 2018; pp. 1-5.

(Continued)

*Primary Examiner* — Mohammad A Siddiqi
(74) *Attorney, Agent, or Firm* — Kilpatrick Townsend & Stockton LLP

(57) ABSTRACT

Techniques for synchronizing the authentication state of a user across data centers using event messages are provided herein. In one example, a system can determine a first change in the authentication state, update a first data structure representing the authentication state in a first data center based on the change, and store a first event message indicating the first change in a message queue. The system can then transmit the first event message to a second data center. Based on the event message, the second data center can update a second data structure also representing the authentication state of the user. In some examples, the second data center can also transmit a second event message to the first data center indicating a second change to the authentication state of the user. The first data center can update first data structure based on the second event message.

20 Claims, 7 Drawing Sheets

(56) References Cited

U.S. PATENT DOCUMENTS

| | | | |
|---|---|---|---|
| 2016/0163186 A1* | 6/2016 | Davidson | G06Q 50/06 |
| | | | 340/506 |
| 2018/0278610 A1* | 9/2018 | Huang | H04L 67/1095 |
| 2020/0012779 A1* | 1/2020 | Chandrasekaran | G06F 21/64 |
| 2020/0068400 A1* | 2/2020 | Ramic | H04L 63/102 |
| 2020/0366704 A1* | 11/2020 | Vasudevan | H04L 63/1433 |
| 2022/0014421 A1 | 1/2022 | Medam et al. | |
| 2022/0237097 A1* | 7/2022 | Khetarpal | G06F 21/33 |
| 2022/0263782 A1* | 8/2022 | Chow | H04L 51/58 |

OTHER PUBLICATIONS

Teger et al., "Oracle Fusion Middleware Administrator's Guide for Oracle Access Management, 11g Release 2 (11.1.2.2) for All Platforms," https://docs.oracle.com/cd/E40329_01/admin.1112/e27239.pdf, Jun. 2015; pp. 1-1580.

* cited by examiner

SYNCHRONIZING A USER'S AUTHENTICATION STATE ACROSS MULTIPLE DATA CENTERS USING EVENT MESSAGES

TECHNICAL FIELD

The present disclosure relates generally to user authentication on a computer system. More specifically, but not by way of limitation, this disclosure relates to maintaining consistency of a user's authentication state across multiple data centers using event messages.

BACKGROUND

Identity and access management can be a framework of policies and technologies to ensure the correct user has access to the correct technology resources. Identity and access management may control both proper access for individuals as well as access to hardware resources and software applications.

When a user accesses a data center, an identity and access framework may assign the user an authentication state. As the user performs various activities, or as various events occur, the authentication state may change. Authentication states may be represented by data structures. The data structures may be composed into a variety of states to indicate levels of access to a variety of resources. Data structures representing authentication states may be stored on data centers. In order to ensure authentication states for users remain consistent across multiple data centers, a data center may copy the contents of a most recent data structure from another data center. In order to copy a data structure from the other data center, the first data center may have to verify it has permission to do so or the first data center may require verification from the other data center that the data structure it intends to copy is legitimate.

DETAILED DESCRIPTION

Figure 1:
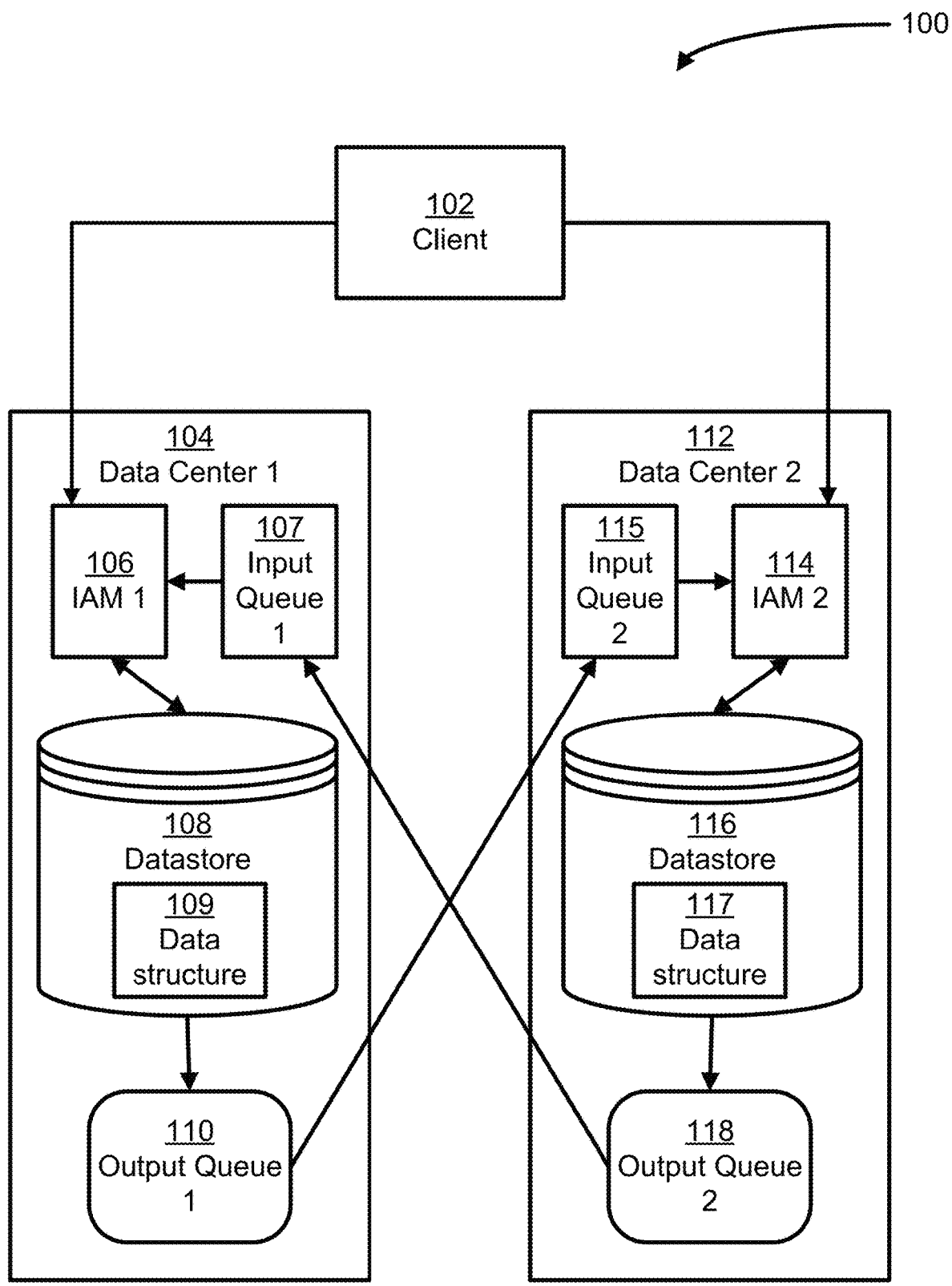
FIG. 1 is a block diagram of an infrastructure for synchronizing the authentication state of a user across data centers using event messages according to some aspects of the present disclosure.

Data structures representing user's authentication states in a computer system may be copied from one data center to another when a user's authentication state changes. This copying may occur to keep the authentication state consistent across multiple data centers. Authentication states may need to be highly available and maintained across multiple data centers for a variety of reasons, such as allowing a user to access their software programs when one data center is unavailable. For example, a user may log out of an application running on a first data center. In order to prevent a malicious user masquerading as the original user from accessing the same application on a second data center, the second data center may have to copy the data structure representing the logged-out authentication state from the first data center. The first data center may then have to wait for confirmation from the second data center that the copying process was successful. Fully copying these data structures and waiting for confirmation of the copying process can consume valuable time and computing resources. Alternatively, hosting the data structure across both the first and second data center can consume a great deal of bandwidth. In either approach, a resulting lack of synchronicity in the authentication state on each data center can result in conflicts that could either disrupt a user's experience of a session or result in security vulnerabilities.

Some examples of the present disclosure can overcome one or more of the abovementioned problems by transmitting and receiving event messages related to changes in the authentication state rather than fully copying the data structures. These event messages may be smaller in size than transmissions including an entire data structure. Relatively small event messages may allow for authentication states to be updated at faster speeds and with less latency issues. An event message from a first data center related to a change in the data structure on the first data center may, when received by a second data center, cause the data structure on the second data center to adopt the same change to its data structure that occurred on the first data center, thus maintaining synchronicity of the authentication states across the two data centers.

More specifically, event messages may be generated by a first data center in response to various events that change the user's authentication state. For example, when an event occurs that changes the user's authentication state in the first data center, a corresponding event message may be generated and stored in a queue in the first data center. The first data center may also update the local data structure representing the authentication state of the user based on the event. The queue may maintain an order of the event messages so that, when the event messages are transmitted from the first data center to a second data center, that order may be retained. The second data center can receive the event messages and sequentially apply their corresponding changes to its local data structure representing the authentication state of the same user, so that the state of the second data structure in the second data center after applying the changes is the same as the state of the first data structure in the first data center, thereby effectively synchronizing the authentication state of the user across both data centers.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an infrastructure 100 for synchronizing the authentication state of a user across data centers using event messages according to some aspects of the present disclosure. The infrastructure 100 includes a remotely located client 102, a first data center 104, and a second data center 112. Within the first data center 104 and the second data center 112 is a first identity and access management (IAM) instance 106 and a second IAM instance 114, respectively. The data centers 104, 112 also include a first datastore 108 and second datastore 116, respectively. The datastores 108, 116 may include data structures 109, 117 related to an authentication state associated with the client 102. The data centers 104, 112 also include a first output queue 110 and second output queue 118, respectively, for storing and sending event messages to other data centers. The first data center 104 has a first input queue 107 specifically for receiving event messages from the second output queue 118 of the second data center 112. The second data center 112 has a second input queue 115 specifically for receiving event messages from the first output queue 110 of the first data center 104.

The client 102 may connect to an IAM instance in any datacenter. An IAM instance may present the client 102 with login dialogues or other prompts to enter credentials. The client 102 may perform various actions (e.g., OpenID connection actions), such as issuing authentication requests to create a session for a user, token requests to create authentication tokens, refresh requests to refresh an existing authentication token, or logout requests to logout of the session. In response to one or more of those actions, the first IAM instance 106 may determine a change in the authentication state caused by the client 102. In such an example, the data structure 109 within the datastore 108 may be updated to reflect the change. The first data center 104 may then transmit an event message to the second data center 112, which can receive the event message at the second input queue 115 and pass it on to the second IAM instance 114. The second IAM instance 114 can receive the event message, which indicates the change in the authentication state triggered by the client 102, and update the second data structure 117 accordingly.

A similar process can occur on the second data center 112. For example, the client 102 can interact with the second data center 112, or an event can occur, that causes the client's authentication state to change. The second IAM instance 114 can detect this change and generate an event message associated with the change. The second IAM instance 114 can then store the event message in a second output queue 118, from which the event message can be transmitted to the first data center 104. The first data center 104 can receive the event message at the first input queue 107 and pass it on to the first IAM instance 106. The first IAM 106 may receive the event message and update the data structure 109 within the first datastore 108 accordingly.

Figure 2:
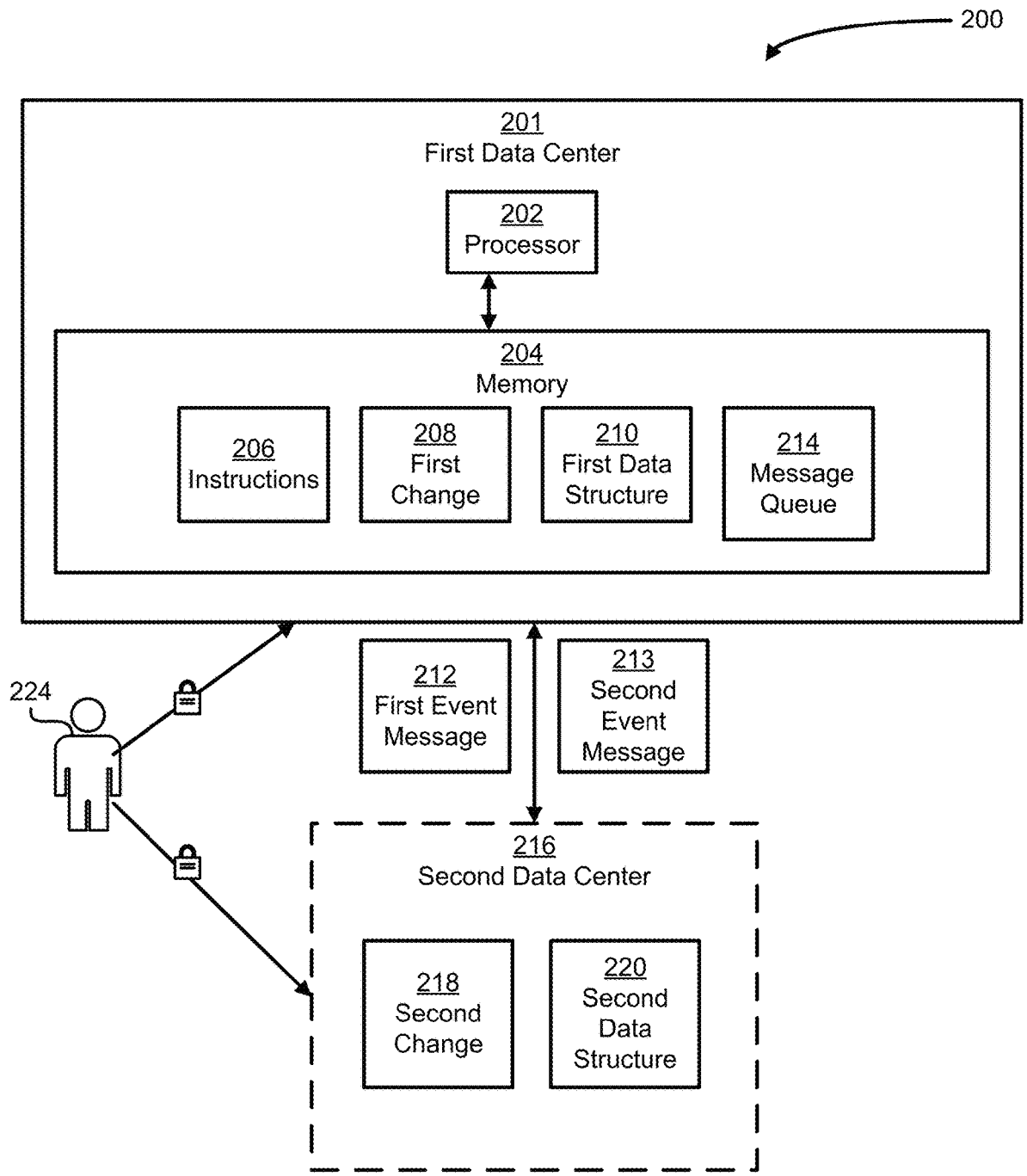
FIG. 2 is a block diagram of an example of a system for maintaining the consistency of data structures representing authentication states across data centers according to some aspects of the present disclosure.

FIG. 2 is a block diagram of an example of a system 200 for maintaining the consistency of data structures representing authentication states across data centers according to some aspects of the present disclosure. The first data center 201 includes a processor 202 communicatively coupled to a memory 204. In some examples, the processor 202 and the memory 204 may be parts of the same computing device. In other examples, the processor 202 and the memory 204 can be distributed (e.g., in separate housings) and remote from one another.

The processor 202 can include one processing device or multiple processing devices. Examples of the processor 202 include a Field-Programmable Gate Array (FPGA), an application-specific integrated circuit (ASIC), and a microprocessor. The processor 202 can execute instructions 206 stored in the memory 204 to perform operations. The instructions 206 may include processor-specific instructions generated by a compiler or an interpreter from code written in any suitable computer-programming language, such as C, C++, C#, and Java.

The memory 204 can include one memory device or multiple memory devices. The memory 204 can be volatile or non-volatile in that the memory 204 retains stored information when powered off. Examples of the memory 204 can include electronic, optical, magnetic, or other storage devices capable of providing the processor 202 with computer-readable instructions or other program code. Examples of a computer-readable medium include magnetic disks, memory chips, ROM, random-access memory (RAM), an ASIC, a configured processor, optical storage, or any other medium from which a computer processor can read the instructions 206.

In some examples, the processor 202 can execute the instructions 206 to perform operations. For example, the user 224 may establish an authenticated session with the first data center 201. While interacting with the first data center 201, the user's 224 authentication state undergo a first change 208. The processor 202 can determine the first change 208 in the authentication state of the user 224. In response, the processor 202 may update a first data structure 210, representing a current authentication state of the user 224, based on the first change 208 in the authentication state of the user 224. The processor 202 may also store a first event message 212 in a message queue 214 (e.g., an output message queue). The first event message 212 may be associated with the first change 208. For example, the first event message 212 may indicate the first change 208, an event that generated the first change 208, or other information usable by another data center to make a similar change to its own data structure. The processor 202 may transmit the first event message 212 from the message queue 214 to a second data center 216 that is remote from the first data center 201. The second data center 216 may be configured to receive the first event message 212 (e.g., at an input message queue) and update a second data structure 220 based on the first event message 212, where the second data structure 220 also represents the authentication state of the user 224. In this way, the second data structure 220 can be synchronized with the first data structure 210, thereby synchronizing the user's 224 authentication state across the data centers 201, 216.

At another point in time, the user 224 may establish an authenticated session with the second data center 216. While interacting with the second data center 216, the user's 224 authentication state undergo a second change 218. In response, the second data center 216 may update the second data structure 220 based on the second change 218 in the authentication state of the user 224. The second data center 216 may also store a second event message 213 indicating the second change 218 in its own message queue (e.g., output message queue). The second data center 216 may then transmit a second event message 213 from its message queue to the first data center 201. The second event message 213 may be associated with the second change 218 in the authentication state of the user 224. The processor 202 of the first data center 201 may receive the second event message 213 from the second data center 216. The second event message 213 may be received by a separate input message queue, distinct from the message queue 214. The processor 202 may then update the first data structure 210 based on the second event message 213. In this way, the first data structure 210 can be synchronized with the second data structure 220, thereby synchronizing the user's 224 authentication state across the data centers 201, 216. Though only two datacenters 201, 216 are described in this example, it will be appreciated that similar principles can be applied to any number of datacenters.

Figure 3:
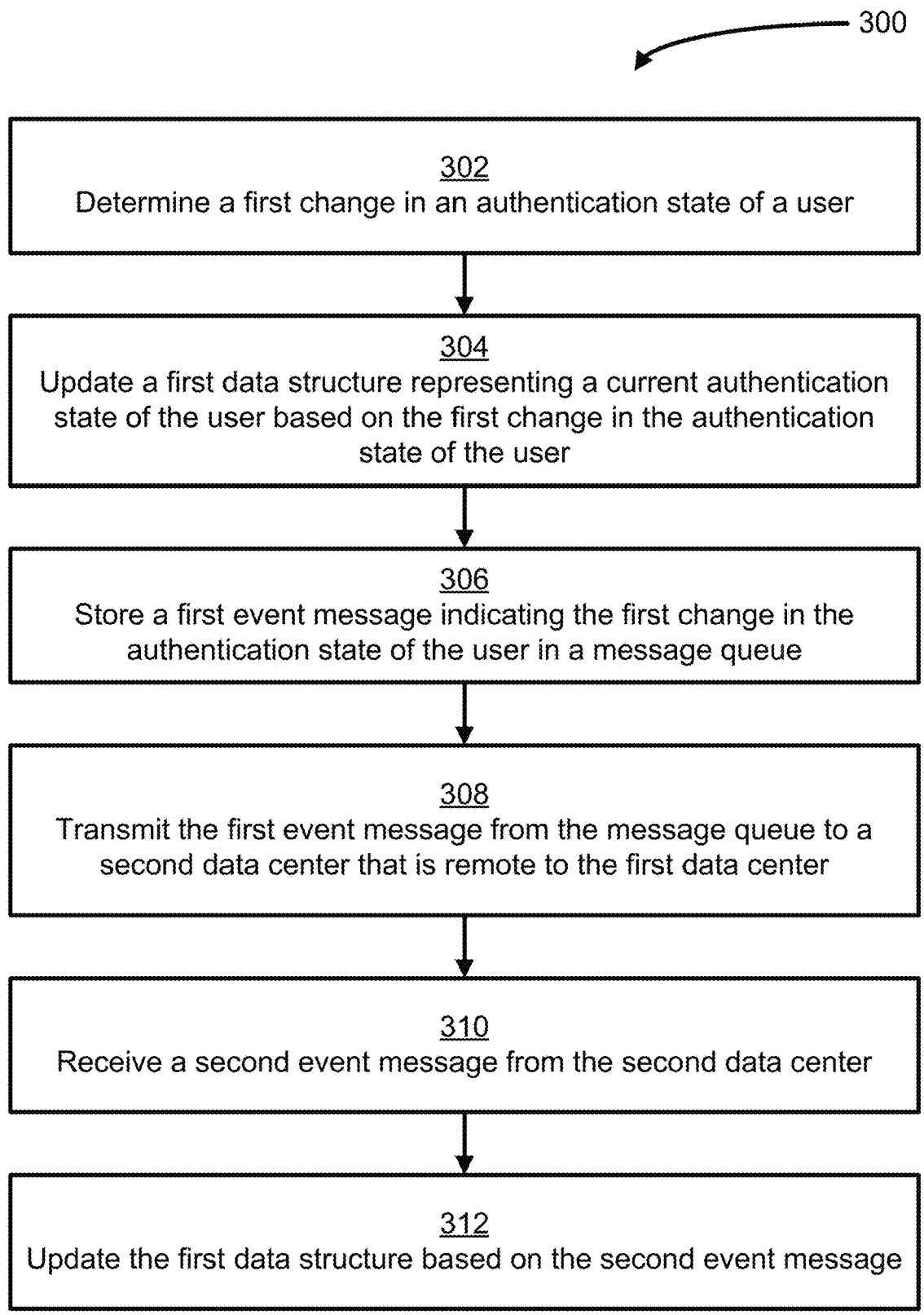
FIG. 3 is a flowchart of an example of a process for updating data structures representing authentication states according to some aspects of the present disclosure.

FIG. 3 is a flowchart of an example of a process for updating data structures representing authentication states according to some aspects of the present disclosure. Other examples may include more operations, fewer operations, different operations, or a different order of operations than is shown in FIG. 3. The operations in FIG. 3 are described below with reference to the components of FIG. 2 above. In general, the process shown in FIG. 3 relates to updating a first data structure 210 and a second data structure 220 to reflect a current authentication state of a user.

In block 302, the processor 202 determines a first change 208 in an authentication state of a user 224. For example, the processor 202 can detect that the user's 224 authentication state has changed, or will be changed, in response to an event occurring in the computing environment of the first data center 201. Example authentication states can include an authenticated state, a renewed state, and a logged-out state. A user's authentication state may change for various reasons, such as the user 224 or the processor 202 determining that the user 224 is to be logged out. In some examples, the processor 202 may detect a change to the user's authentication state that may have been initiated to resolve certain conflicts, such as a logged-out state in one data center conflicting with any other state in any other data center.

In bock 304, the processor updates the first data structure 210 representing a current authentication state of the user 224 based on the first change 208 in the authentication state of the user 224. The first change 208 in the authentication state of the user 224 may be a result of an operation performed by the user 224 via their client device, such as the client 102 of FIG. 1.

In block 306, the processor 202 stores a first event message 212 indicating the first change 208 in the authentication state of the user 224 in a message queue 214. In some examples, the message queue 214 may be a first-in-first-out (FIFO) queue. The message queue 214 may be part of an event streaming product, such as Apache® Kafka®. The message queue 214 may maintain an order of event messages in which they are received. The message queue 214 may be specific to the data center 201, as opposed to being shared between data centers. In some examples, the first data center 201 may have multiple input message queues for receiving event messages from multiple other data centers, for use in maintaining continuity of the authentication state of the user 224 across the data centers. Each input message queue can correspond to one of the other data centers for receiving event messages from that data center and only that data center.

In block 308, the processor 202 transmits the first event message 212 from the message queue 214 to a second data center 216 that is remote to the first data center 201. The second data center 216 may be configured to receive the first event message 212 and update a second data structure 220 based on the first event message 212. The second data structure 220 may also represent the current authentication state of the user 224. Transmitting event messages rather than transmitting entire authentication states may more reliably keep authentication states consistent across multiple data centers. For example, sending an entire authentication state between data centers may take so long, because it is so large, that the true authentication state has changed by the time the old authentication state is received. Sending smaller event messages may reduce instances in which the authentication state changes between transmissions or reduce the amount of authentication state changes that may occur between transmissions.

In some examples, the processor 202 may receive a sequence of event messages from the second data center 216. The sequence of event messages may indicate a sequence of changes in the authentication state of the user 224. In some such examples, the processor 202 may process the sequence of event messages in in the order in which they were received to sequentially apply their corresponding changes to the first data structure 210, thereby maintaining state consistency across the data centers 201, 216. An example of this process with respect to a single event message is described below in blocks 310-312.

In block 310, the processor 202 receives a second event message 213 from the second data center 216. The second event message 213 may indicate a second change 218 in the authentication state of the user 224. The second data center 216 may not require any confirmation that the second event message 213 has been received. Instead of relying on confirmation, an event streaming product, such as Apache® Kafka®, may ensure that the second event message 213 is received.

In block 312, the processor 202 updates the first data structure 210 based on the second event message 213. In some examples where a plurality of event messages were transmitted from a second message queue of the second data center 216, the processor 202 may update the first data structure 210 based on the order of the plurality of event messages received from the second message queue. In some examples where the first event message 212 and the second event message 213 conflict, the processor 202 may update the first data structure 210 to a logged-out state out of caution.

Figure 4:
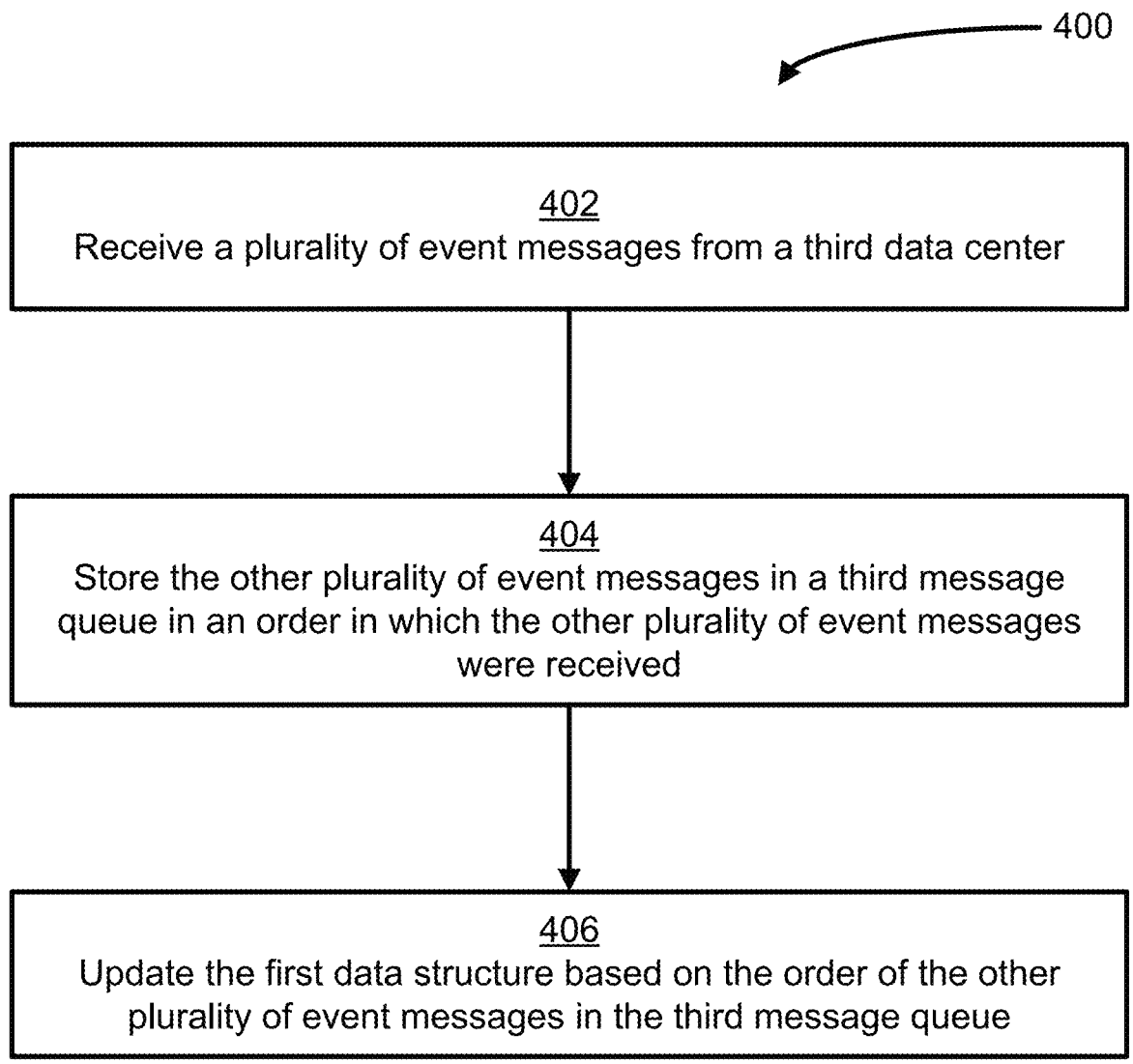
FIG. 4 is a flowchart of an example of a process for updating a data structure representing an authentication state according to some aspects of the present disclosure.

FIG. 4 is a flowchart of a process for updating a data structure representing an authentication state according to some aspects of the present disclosure. Other examples may include more operations, fewer operations, different operations, or a different order of operations than is shown in FIG. 4. The operations in FIG. 4 are described below with reference to the components of FIG. 2 above.

In block 402, the processor 202 of the first data center 201 receives a plurality of event messages from a third data center. The third data center may include an input message queue and an output message queue. The output message queue may be similar to the message queue 214 of the first data center 201. The output message queue of the third data center may be designed specifically for providing event messages from the third data center to the first data center 201. An input message queue of the third data center may be designed specifically to subscribe to a corresponding output message queue of the first data center 201, for use in receiving event messages from the first data center 201.

In block 404, the processor 202 of the first data center 201 stores the plurality of event messages in a third message queue, which may be an input message queue of the first data center 201. The processor 202 may store the event messages in the third message queue in an order in which the other plurality of event messages were received from the third data center. The third message queue of the first data center 201 may be internal to the first data center 201 and specifically for storing event messages received from the third data center, in the sense that the third message queue is only used to store messages from the third data center and not to store any messages received from any other data centers.

The first data center 201 may include any number of such specific input message queues corresponding to any number of other data centers for receiving and storing event messages received from those data centers. Using a specific input queue for each data center (e.g., rather than a single queue that stores the event messages received from all of the other data centers) can help the first data center 201 process the event messages in the correct order, so that the user's state is maintained in synch across multiple data centers. Additionally, having unique input queues for each data center rather than having a single, central queue or other central software program handling event messages between data centers may eliminate a possible point of failure. For example, failure of a central queue may interrupt any data center's ability to receive event messages from any other data center or process changes to the user's authentication state.

In block 406, the processor 202 updates the first data structure 210 based on the order of the plurality of event messages in the third message queue. The processor 202 may resolve inconsistencies within the plurality of event messages so that the first data structure 210 can be updated in a cogent state. For example, the processor 202 may receive event messages from the third data center and the second data center 216. An event message from the third data center and the event message from the second data center 216 may conflict. An example irregularity may be the message from the third data center indicating a logged-out authentication state while the message from the second data center 216 indicates a new authentication. Inconsistencies may prompt the processor 202 to execute an audit, which may resolve the conflict between the message from the third data center and the message from the second data center 216.

Figure 5:
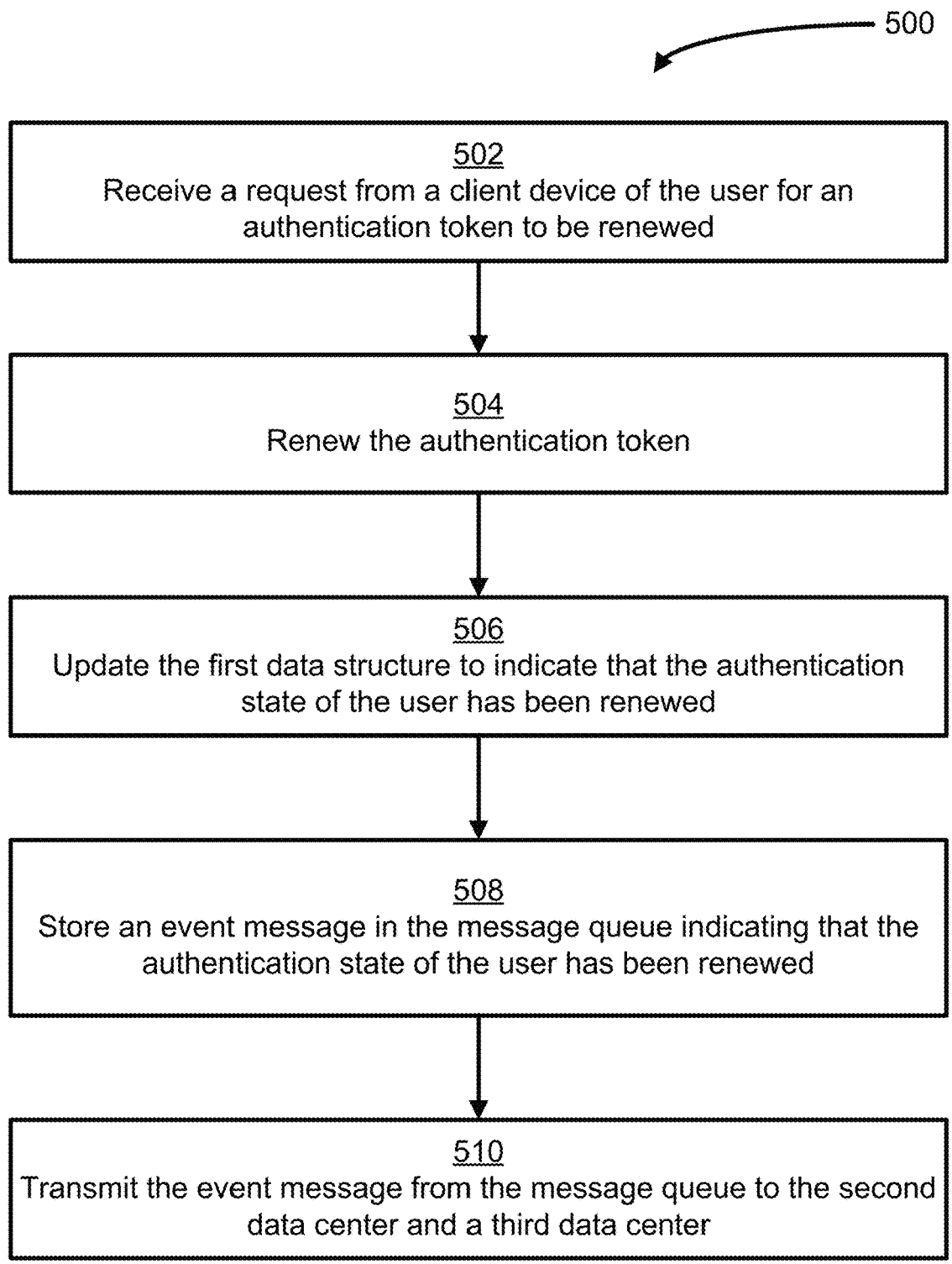
FIG. 5 is a flowchart of an example of a process for handling a request to renew an authentication token according to some aspects of the present disclosure.

FIG. 5 is a flowchart of an example of a process for handling a request to renew an authentication token according to some aspects of the present disclosure. Other examples may include more operations, fewer operations, different operations, or a different order of operations than is shown in FIG. 5. The operations in FIG. 5 are described below with reference to the components of FIG. 2 above. In general, the process shown in FIG. 5 relates to synchronizing an authentication state of a user 224 across data centers after the user's authentication state has been renewed.

In block 502, the processor 202 receives a request token from a client device of the user 224 for an authentication token to be renewed.

In block 504, the processor 202 renews the authentication token.

In block 506, the processor 202 updates the first data structure 210 to indicate that the authentication state of the user 224 has been renewed.

In block 508, the processor 202 stores an event message (e.g., first event message 212) in a message queue (e.g., message queue 214) indicating that the authentication state of the user 224 has been renewed.

In block 510, the processor 202 transmits the event message from the message queue to the second data center 216 and the third data center, the second data center 216 and the third data center being configured to update respective data structures representing the current authentication state of the user 224 based on the event message.

Figure 6:
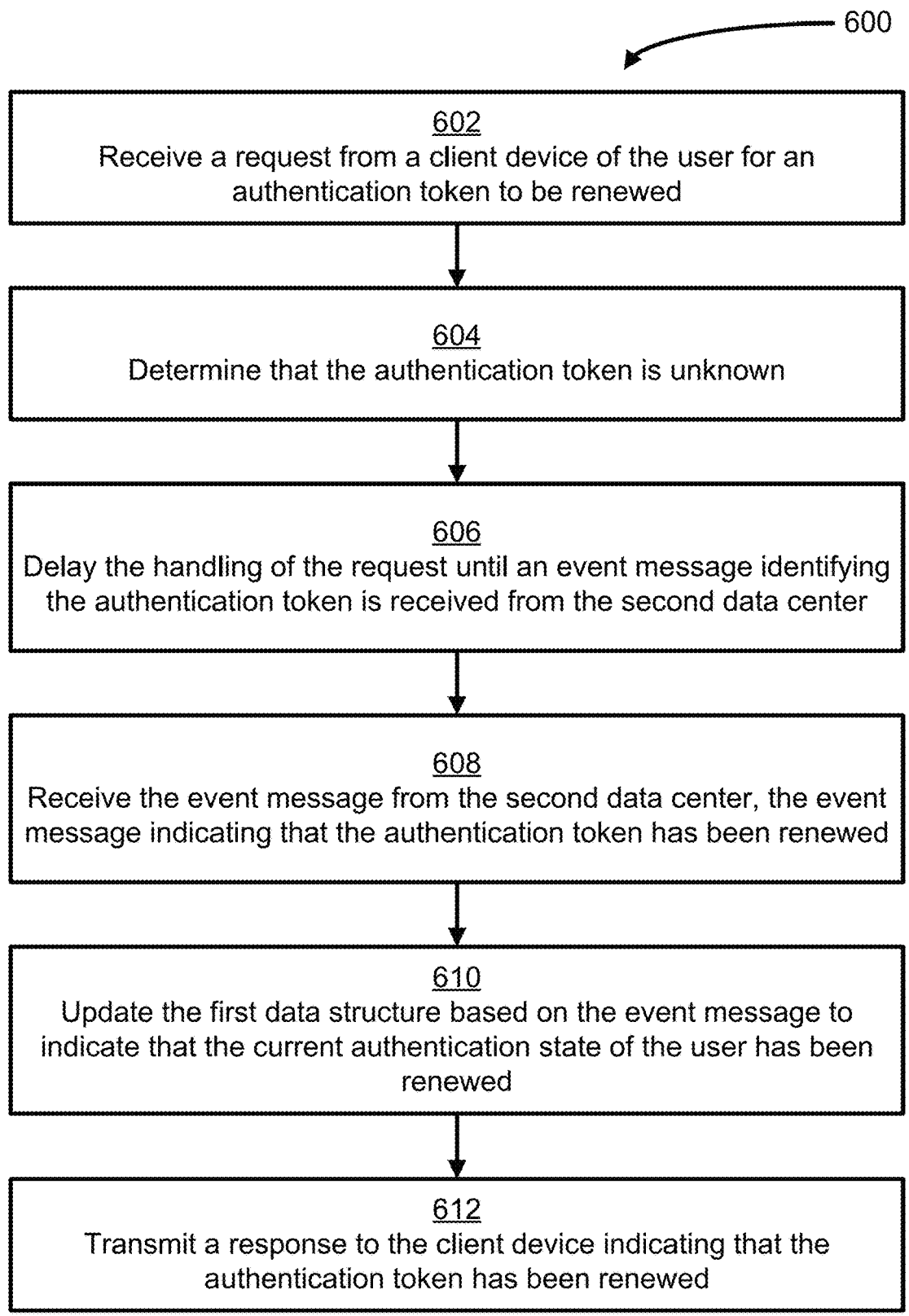
FIG. 6 is a flowchart of an example of a process for handling a request to renew an unknown authentication token according to some aspects of the present disclosure.

FIG. 6 is a flowchart of an example of a process for handling a request to renew an unknown authentication token according to some aspects of the present disclosure. Other examples may include more operations, fewer operations, different operations, or a different order of operations than is shown in FIG. 6. The operations in FIG. 6 are described with reference to the components of FIG. 2 above. In general, the process shown in FIG. 6 relates to handling an unknown authentication token during a process for synchronizing an authentication state of a user 224 across data centers.

In block 602, the processor 202 may receive a request from a client device (e.g., client 102) of the user 224 for an authentication token to be renewed.

In block 604, in response to receiving the request, the processor 202 may determine that the authentication token is unknown. The authentication token may be unknown if there is no information about it stored in the second data center 216, for example because an event message identifying the authentication token has not yet been received by the processor 202.

In block 606, in response to determining that the authentication token is unknown, the processor 202 delays handling of the request until the event message identifying the authentication token is received from the second data center 216. The processor 202 may delay handling the request to ensure that the authentication token is received from the second data center 216.

In block 608, the processor 202 receives the event message from the second data center 216. The event message can identify the authentication token and its state, for example that the authentication token has been renewed. In some examples where the processor 202 does not receive the event message identifying the authentication token or its corresponding state, the processor 202 may logout the user 224 (e.g., out of caution) by updating the first data structure 210 to a logged-out state.

In block 610, the processor 202 updates the first data structure 210 based on the event message to indicate that the current authentication state of the user 224 has been renewed.

In block 612, the processor 202 may transmit a response to the client device indicating that the authentication token has been renewed.

Figure 7:
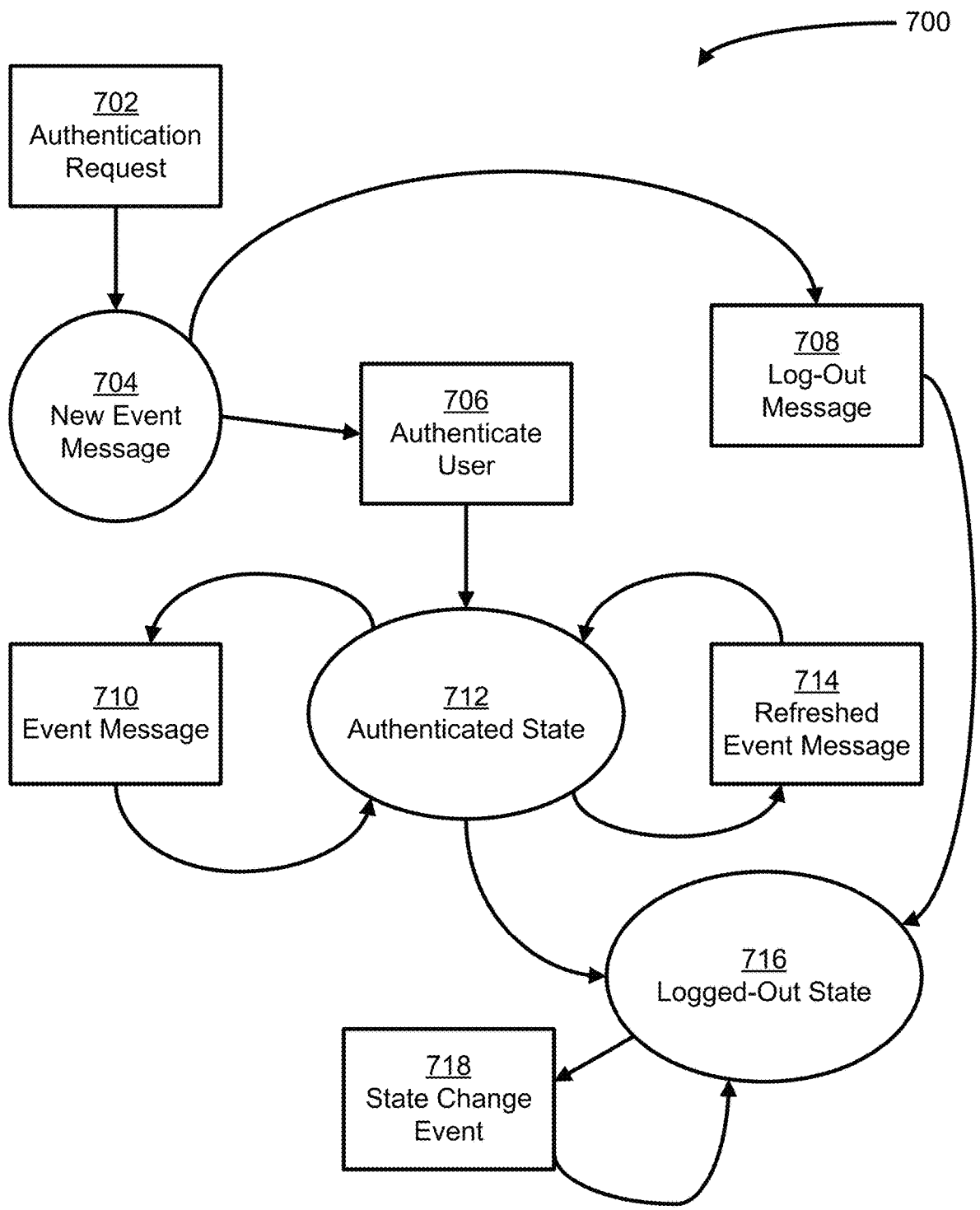
FIG. 7 is a state diagram of an example of processes for switching between authentication states according to some aspects of the present disclosure.

FIG. 7 is a state diagram of an example of processes for switching between authentication states according to some aspects of the present disclosure. The process 700 may begin with an authentication request 702 from either a client device or a data center. The authentication request 702 may trigger the generation of a new event message 704, which can cause the system to authentication the user 706. At this point the user is in an authenticated state 712. Alternatively, the authentication request 702 may trigger the generation of a logout-message 708 that can cause the user's authentication state to transition to a logged-out state 716. Detection of a state change event 718 from the same data center or another data center may also result in the user's authentication state being transitioned to the logged-out state 716.

The user may remain in the authenticated state 712 in response to other event messages 710. The user may also remain in the authenticated state 712 in response to refreshed event messages 714, which may refresh the authentication state of the user.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples.

What is claimed is:

1. A non-transitory computer-readable medium comprising program code that is executable by a processor of a first data center for causing the processor to:
- receive a request from a client device of a user;
- based on the request, determine a first change in an authentication state of the user from a first authentication state to a second authentication state;
- based on determining the first change in the authentication state of the user:
  - access a first data structure representing a current authentication state of the user;
  - update the first data structure from indicating the first authentication state to the second authentication state;
  - store a first event message indicating the first change in the authentication state of the user in a message queue, wherein the message queue is external to the first data structure; and
  - transmit the first event message from the message queue to a second data center that is remote from the first data center, the second data center being configured to receive the first event message and update a second data structure based on the first event message, the second data structure representing the current authentication state of the user;
- receive a second event message from the second data center, the second event message indicating a second change in the authentication state of the user; and
- update the first data structure based on the second event message.

2. The non-transitory computer-readable medium of claim 1, wherein the message queue is a first message queue, and further comprising program code that is executable by the processor of the first data center for causing the processor to:
- receive a plurality of event messages from the second data center, the plurality of event messages indicating a sequence of changes in the authentication state of the user;
- store the plurality of event messages in a second message queue in an order in which the plurality of event messages were received, the second message queue being external to the first data structure; and
- update the first data structure based on the order of the plurality of event messages in the second message queue.

3. The non-transitory computer-readable medium of claim 2, further comprising program code that is executable by the processor of the first data center for causing the processor to:
- receive another plurality of event messages from a third data center;
- store the other plurality of event messages in a third message queue in an order in which the other plurality of event messages were received, the third message queue being specific to the third data center and the second message queue being specific to the second data center, and the third message queue being external to the first data structure; and
- update the first data structure based on the order of the other plurality of event messages in the third message queue.

4. The non-transitory computer-readable medium of claim 3, wherein the request is a first request, and further comprising program code that is executable by the processor for causing the processor to:
- receive a second request from the client device of the user for an authentication token to be renewed; and
- in response to receiving the second request:
  - renew the authentication token;
  - update the first data structure to indicate that the authentication state of the user has been renewed;
  - store an event message in the message queue indicating that the authentication state of the user has been renewed; and
  - transmit the event message from the message queue to the second data center and the third data center, the second data center and the third data center being configured to update respective data structures representing the current authentication state of the user based on the event message.

5. The non-transitory computer-readable medium of claim 1, wherein the request is for modifying the authentication state of the user from the first authentication state to the second authentication state, and further comprising program code that is executable by the processor for causing the processor to:
- based on receiving the request, update the first data structure based on event messages from other data centers, prior to transmitting a response to the request to the client device.

6. The non-transitory computer-readable medium of claim 1, further comprising program code that is executable by the processor for causing the processor to:
- subscribe to event systems of a plurality of data centers to maintain continuity of the authentication state of the user by receiving a plurality of event messages related to changes in the authentication state of the user in a plurality of queues, wherein each queue of the plurality of queues corresponds to an individual data center for receiving event messages from that data center.

7. The non-transitory computer-readable medium of claim 1, further comprising program code that is executable by the processor for causing the processor to:
- receive the request from the client device of the user, wherein the request is for an authentication token to be renewed;
- in response to receiving the request, determine that the authentication token is unknown;
- in response to determining that the authentication token is unknown, delay handling of the request until an event message identifying the authentication token is received from the second data center;
- receive the event message from the second data center, the event message indicating that the authentication token has been renewed;
- update the first data structure based on the event message to indicate that the current authentication state of the user has been renewed; and
- transmit a response to the client device indicating that the authentication token has been renewed.

8. A method comprising:
- receiving, by one or more processors of a first data center, a request from a client device of a user;
- based on the request, determining, by the one or more processors of the first data center, a first change in an authentication state of the user from a first authentication state to a second authentication state;
- based on determining the first change in the authentication state of the user:
  - accessing, by the one or more processors, a first data structure representing a current authentication state of the user;
  - updating the first data structure from indicating the first authentication state to the second authentication state;

storing, by the one or more processors, a first event message indicating the first change in the authentication state of the user in a message queue, wherein the message queue is external to the first data structure; and transmitting, by the one or more processors, the first event message from the message queue to a second data center that is remote to the first data center, the second data center being configured to receive the first event message and update a second data structure based on the first event message, the second data structure representing the current authentication state of the user;

receiving, by the one or more processors, a second event message from the second data center, the second event message indicating a second change in the authentication state of the user; and updating, by the one or more processors, the first data structure based on the second event message.

9. The method of claim 8, further comprising:

receiving, by the one or more processors, a plurality of event messages from the second data center, the plurality of event messages indicating a sequence of changes in the authentication state of the user;

storing, by the one or more processors, the plurality of event messages in a second message queue in an order in which the plurality of event messages were received, the second message queue being external to the first data structure; and updating, by the one or more processors, the first data structure based on the order of the plurality of event messages in the second message queue.

10. The method of claim 9, further comprising:

receiving, by the one or more processors, another plurality of event messages from a third data center;

storing, by the one or more processors, the other plurality of event messages in a third message queue in an order in which the other plurality of event messages were received, the third message queue being specific to the third data center and the second message queue being specific to the second data center, and the third message queue being external to the first data structure; and updating, by the one or more processors, the first data structure based on the order of the other plurality of event messages in the third message queue.

11. The method of claim 8, wherein the request is a first request, and further comprising:

receiving, by the one or more processors, a second request from the client device of the user for an authentication token to be renewed; and in response to receiving the second request:

renewing, by the one or more processors, the authentication token;

updating, by the one or more processors, the first data structure to indicate that the authentication state of the user has been renewed;

storing, by the one or more processors, an event message in the message queue indicating that the authentication state of the user has been renewed; and transmitting, by the one or more processors, the event message from the message queue to the second data center and a third data center, the second data center and the third data center being configured to update respective data structures representing the current authentication state of the user based on the event message.

12. The method of claim 8, wherein the request is a first request, and further comprising:

receiving, by the one or more processors, a second request from the client device of the user for modifying the authentication state of the user; and based on receiving the second request, updating, by the one or more processors, the first data structure to indicate the current authentication state of the user based on event messages from other data centers, prior to transmitting a response to the second request to the client device.

13. The method of claim 8, further comprising subscribing, by the one or more processors, to event systems of a plurality of data centers to maintain continuity of the authentication state of the user by receiving a plurality of event messages related to changes in the authentication state of the user in a plurality of queues, wherein each queue of the plurality of queues corresponds to an individual data center for receiving event messages from that data center.

14. The method of claim 8, wherein the request is a first request, and further comprising:

receiving, by the one or more processors, a second request from the client device of the user for an authentication token to be renewed;

in response to receiving the second request, determining, by the one or more processors, that the authentication token is unknown;

in response to determining that the authentication token is unknown, delaying, by the one or more processors, handling of the request until an event message identifying the authentication token is received from the second data center;

receiving, by the one or more processors, the event message from the second data center, the event message indicating that the authentication token has been renewed;

updating, by the one or more processors, the first data structure based on the event message to indicate that the current authentication state of the user has been renewed; and transmitting, by the one or more processors, a response to the client device indicating that the authentication token has been renewed.

15. A system comprising:

one or more processors of a first data center; and a memory including instructions that are executable by the one or more processors for causing the one or more processors to:

receive a request from a client device of a user;

based on the request, determine a first change in an authentication state of the user from a first authentication state to a second authentication state;

based on determining the first change in the authentication state of the user:

access a first data structure representing a current authentication state of the user;

update the first data structure from indicating the first authentication state to the second authentication state;

store a first event message indicating the first change in the authentication state of the user in a message queue, wherein the message queue is external to the first data structure; and transmit the first event message from the message queue to a second data center that is remote from the first data center, the second data center being configured to receive the first event message and update a second data structure based on the first event message, the second data structure representing the current authentication state of the user;
receive a second event message from the second data center, the second event message indicating a second change in the authentication state of the user; and
update the first data structure based on the second event message.

16. The system of claim 15, wherein the memory further includes instructions that are executable by the one or more processors for causing the one or more processors to:
receive a plurality of event messages from the second data center, the plurality of event messages indicating a sequence of changes in the authentication state of the user;
store the plurality of event messages in a second message queue in an order in which the plurality of event messages were received, wherein the second message queue is external to the first data structure; and
update the first data structure based on the order of the plurality of event messages in the second message queue.

17. The system of claim 16, wherein the memory further includes instructions that are executable by the one or more processors for causing the one or more processors to:
receive another plurality of event messages from a third data center;
store the other plurality of event messages in a third message queue in an order in which the other plurality of event messages were received, the third message queue being specific to the third data center and the second message queue being specific to the second data center, and the third message queue being external to the first data structure; and
update the first data structure based on the order of the other plurality of event messages in the third message queue.

18. The system of claim 15, wherein the request is a first request, and wherein the memory further includes instructions that are executable by the one or more processors for causing the one or more processors to:
receive a second request from the client device of the user for an authentication token to be renewed; and
in response to receiving the second request:
renew the authentication token;
update the first data structure to indicate that the authentication state of the user has been renewed;
store an event message in the message queue indicating that the authentication state of the user has been renewed; and
transmit the event message to the second data center and a third data center, the second data center and the third data center being configured to update respective data structures representing the current authentication state of the user based on the event message.

19. The system of claim 15, wherein the request is a first request, and wherein the memory further includes instructions that are executable by the one or more processors for causing the one or more processors to:
receive a second request from the client device of the user for modifying the authentication state of the user; and
based on receiving the second request, update the first data structure to indicate the current authentication state of the user based on event messages from other data centers, prior to transmitting a response to the second request to the client device.

20. The system of claim 15, wherein the memory further includes instructions that are executable by the one or more processors for causing the one or more processors to:
subscribe to event systems of a plurality of data centers to maintain continuity of the authentication state of the user by receiving a plurality of event messages related to changes in the authentication state of the user in a plurality of queues, wherein each queue of the plurality of queues corresponds to an individual data center.

* * * * *